United States Patent
Franzaroli

(10) Patent No.: US 7,837,023 B2
(45) Date of Patent: Nov. 23, 2010

(54) DEVICE FOR MOVING, IN PARTICULAR FOR ORIENTING LONG ITEMS

(75) Inventor: Massimo Franzaroli, Castel Maggiore (IT)

(73) Assignee: Pulsar S.r.l., Castel Maggiore (Bologna) (IT)

( * ) Notice: Subject to any disclaimer, the term of this patent is extended or adjusted under 35 U.S.C. 154(b) by 54 days.

(21) Appl. No.: 12/295,295

(22) PCT Filed: Mar. 5, 2007

(86) PCT No.: PCT/IB2007/000505
§ 371 (c)(1), (2), (4) Date: Sep. 30, 2008

(87) PCT Pub. No.: WO2007/116251
PCT Pub. Date: Oct. 18, 2007

(65) Prior Publication Data
US 2009/0178903 A1     Jul. 16, 2009

(30) Foreign Application Priority Data
Mar. 31, 2006   (IT) .......................... B02006A0234

(51) Int. Cl.
 *B65G 15/02* (2006.01)
 *B65G 15/12* (2006.01)
(52) U.S. Cl. .................... 198/415; 198/419.3; 198/604; 198/606; 198/698; 198/817; 198/831
(58) Field of Classification Search ................ 198/415, 198/419.3, 604, 606, 626.1, 626.5, 626.6, 198/697, 698, 817, 831
See application file for complete search history.

(56) References Cited

U.S. PATENT DOCUMENTS

| | | | | | |
|---|---|---|---|---|---|
| 1,206,305 | A | * | 11/1916 | Cowley | 198/817 |
| 1,930,318 | A | * | 10/1933 | Mojonnier | 209/658 |
| 3,367,474 | A | * | 2/1968 | Kerr | 198/415 |
| 3,509,984 | A | * | 5/1970 | Huffman et al. | 198/415 |
| 3,690,443 | A | * | 9/1972 | Snyder | 198/457.03 |
| 5,673,784 | A | * | 10/1997 | Karpinsky et al. | 198/831 |
| 5,806,663 | A | * | 9/1998 | Lopez Alba | 198/817 |
| 2004/0178047 | A1 | * | 9/2004 | Leisner | 198/623 |

FOREIGN PATENT DOCUMENTS

DE   20 2005 008 312 U1   7/2005

(Continued)

*Primary Examiner*—Mark A Deuble
(74) *Attorney, Agent, or Firm*—Young & Thompson

(57) ABSTRACT

A device (10) for orienting tubular cores made of card for supporting rolls of toilet or kitchen paper includes elements for imparting an angular movement to each long item (11) in such a way that it is fed out of the device at a suitable angle. The elements for the angular orientation of the item (11) are designed to cause the item to be fed forward while keeping it substantially-transversal to the direction of feed and include first mobile members (12) for feeding a corresponding portion of the item (11) and extending along a respective path, which has a curved section (12a), and second mobile members (14) for feeding a second portion of the item (11) and extending along a respective path having a curved section (14a) which is concentric with and radially inside the curved section (12a) of the first mobile feed members (12).

20 Claims, 4 Drawing Sheets

FOREIGN PATENT DOCUMENTS

| | | | |
|---|---|---|---|
| EP | 1 321 388 A1 | | 6/2003 |
| GB | 2067494 A | * | 7/1981 |
| JP | 6-271030 A | | 9/1994 |
| NL | 1 029 294 C2 | | 12/2006 |
| WO | 2004/005172 A1 | | 1/2004 |

* cited by examiner

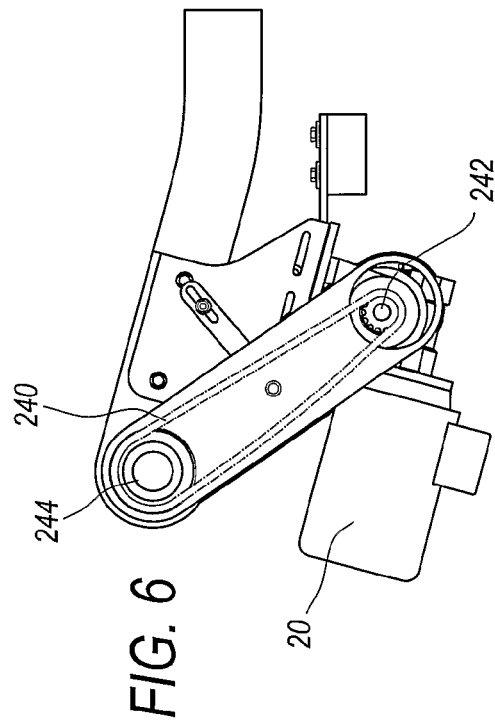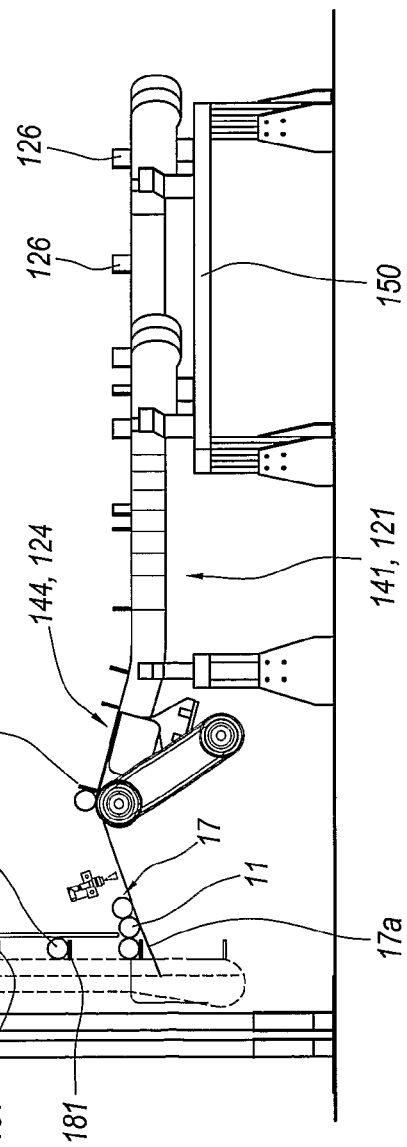

DEVICE FOR MOVING, IN PARTICULAR FOR ORIENTING LONG ITEMS

TECHNICAL FIELD

This invention relates to a device for moving and, in particular for orienting long items.

More specifically, the items are tubular cores made of card, used for making rolls, preferably rolls of toilet or kitchen paper.

BACKGROUND ART

In the tissue paper industry, especially in the production of rolls of toilet or kitchen paper, floor space in production facilities is a very important factor taken into consideration when planning machinery layout. To save space, the machines for making the tubular card cores for the rolls are oriented at an angle to the rewinding machine or system that winds the paper onto the tubular cores.

In particular, prior art teaches the use of devices for orienting tubular cores made of card, used for making rolls, preferably rolls of toilet or kitchen paper. These devices comprise means for imparting an angular movement to the long items in such a way that they are fed out of the device at a suitable angle. For transferring the tubular card cores, which are relatively long and easily damaged, the angular orienting means comprise means that receive the card cores from a chute on which they are fed out of the machine that makes them. These receiving means comprise a conveyor belt, on the outer side of the curved section along which the tubular cores move, and a fixed plate for engaging the ends of the tubular cores and located on the inner side of the curved section along which the tubular cores move.

This type of device for orienting long items or cores, however, has the drawback of not allowing high conveying speeds to be reached. When the conveying speed is increased, the card cores are subjected to high accelerations tending to move them out of position so they are incorrectly aligned when they reach the transfer point downstream, at the feed magazine of the paper roll rewinding machine.

Moreover, the card the cores are made of is not very resistant, so the cores are easily damaged and can be permanently misshapen. In particular, the rolling action the cores are subjected to, according to prior art, in order to orient them may lead to severe scratching and scoring on the surface of the cores, causing damaged items to be rejected.

DISCLOSURE OF THE INVENTION

According to an advantageous aspect of it, it is therefore provided a device for moving and, in particular for orienting long items, these items being, more specifically, tubular cores made of card, used for making rolls, preferably rolls of toilet or kitchen paper; each long item having a longitudinal axis and opposite ends; the device being characterised in that it comprises means for defining an angular movement of the axis of the long item, such that the long item is fed out of the device at a suitable angle; and characterised also in that the means for the angular orientation of the item are designed to cause the item to be fed forward while keeping it substantially transversal to the direction of feed.

Thus, the cores are accompanied as they proceed along the curved section of the orientation path, enabling high feed speeds to be attained and/or reducing the risk of damaging the cores.

In particular, the core is prevented from rolling on its own axis, which reduces the risk of unwanted scoring on the core surface.

According to another advantageous aspect, the device comprises first mobile means for feeding a corresponding portion of the item and extending along a respective path, which has a curved section, and second mobile means for feeding a second portion of the item and extending along a respective path having a curved section which is concentric with and radially inside the curved section of the first mobile feed means.

BRIEF DESCRIPTION OF THE DRAWINGS

These and other technical characteristics of present device are clearly described in the claims below and its advantages are apparent from the detailed description which follows, with reference to the accompanying drawings which illustrate a preferred embodiment of the invention provided merely by way of example without restricting the scope of the inventive concept, and in which:

FIG. 3 is a side view showing the transfer, or end, portion of the preferred embodiment of the device according to the invention;

FIG. 6 is a side view, partly in cross section, showing the end drive portion of the preferred embodiment of the device according to the invention.

DETAILED DESCRIPTION OF THE PREFERRED EMBODIMENTS OF THE INVENTION

The accompanying drawings illustrate a preferred embodiment 10 of a device according to the invention for orienting long items, where said items are tubular cores 11 made of card household use for supporting rolls of paper, preferably for bathroom or household use.

As illustrated, the long item, or tube, 11 extends mainly lengthways along an axis "L" between two opposite ends 11a and 11b.

Figure 1:
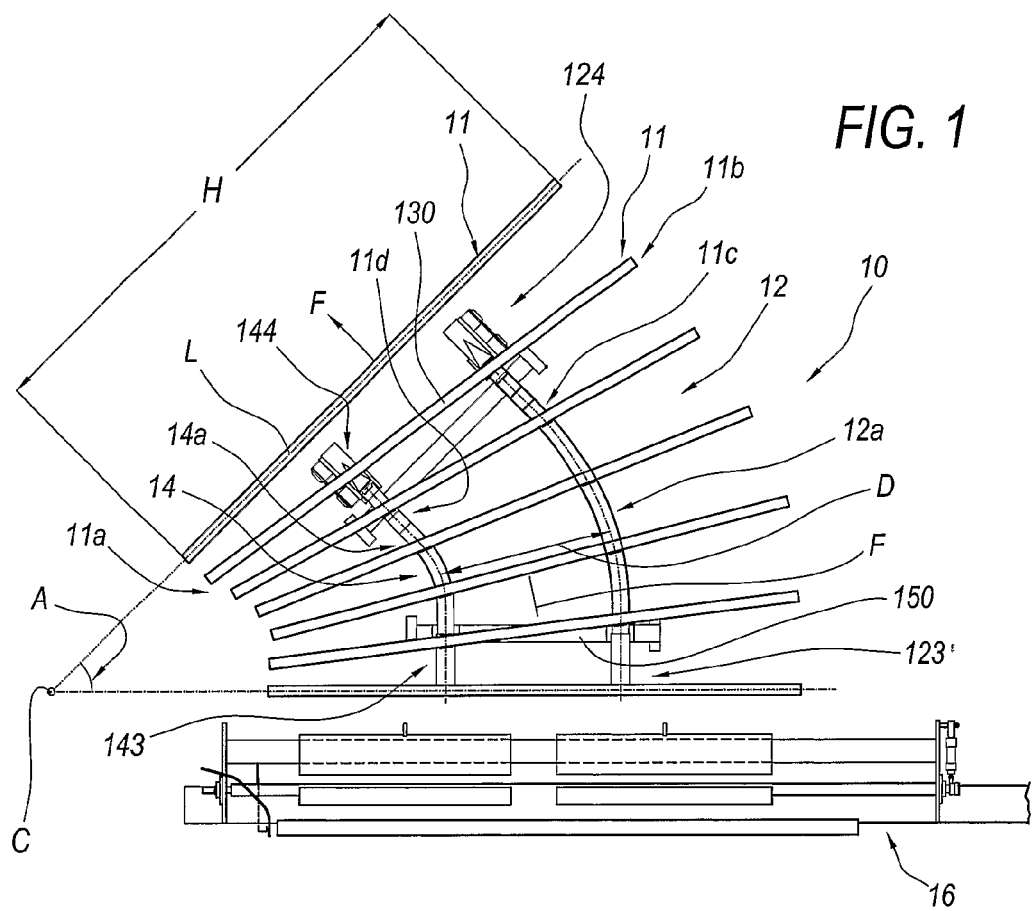
FIG. 1 is a top view of a preferred embodiment of the device according to the invention.

The device according to the invention comprises means for imparting to each item an angular movement, labelled "A" in FIG. 1, such that the item 11 is suitably oriented when it is fed out of the device.

The reference character "F" in FIG. 1 denotes arrows indicating the feed direction of the items at the respective positions.

Advantageously, the means for the angular orientation of the item 11 are designed to cause the item to be fed forward while keeping it substantially transversal to the direction of feed at the specific point.

In this way, operations can be performed even at high speed without the risk of damaging the tubular card core.

In practice, this prevents the tubular core from rolling and thus scoring its surface.

More specifically, the ends 11a and 11b of the items are moved in such a way as to follow respective curved concentric paths, one outside the other.

Advantageously, first mobile means 12 are provided for feeding a corresponding portion of the item 11 and extending along a respective path, which has a curved section 12a, and second mobile means 14 are provided for feeding a second portion of the item 11 and extending along a respective path having a curved section 14a which is concentric with and radially inside the curved section 12a of the first mobile feed means with reference to the centre of rotation "C".

As illustrated, in particular in FIG. 1, the first means 12 for feeding the item 11 are advantageously adapted to engage a respective intermediate portion 11c of the item and the second means 14 for feeding the item 11 are in turn adapted to engage a respective intermediate portion 11d of the item, these intermediate portions 11c and 11d being at a distance from the respective ends 11a and 11b of the item 11.

In this way, the long tubular card item is conveniently supported and does not run the risk of bending as it advances, in particular along the horizontal path.

In particular, the long tubular card item may be conveniently advanced at high speeds without the risk of being damaged.

In particular, as illustrated, the distance between the portion 11c engaged by the first feed means 12 and the respective end 11b is approximately one third of the length "H" of the item 11, and the distance between the portion 11d engaged by the second feed means 14 and the respective end 11a of the tubular item 11 is also approximately one third of the length, which means that the distance "D" between the first and the second feed means 12 and 14 is substantially one third of the length of the item 11. Since the cores normally vary in length from 2500 mm to 3000 mm, the feed means 12 and 14 are preferably around 900 mm apart.

This provides optimum support for the long card item.

in this way, the tubular item, which is made of card and is therefore easily deformed, can be transported or moved along a curved path even at high speeds without deforming or damaging it.

As illustrated, the feed means 12, 14 are designed to receive and support the underside of the items 11, which move along a mainly horizontal path.

As illustrated, the feed means take the form of respective endless conveyors 12, 14, each composed of a plurality of links articulated to each other and mounted on a respective frame 121, 141, forming a respective conveyor path.

The conveyors 12, 14 might, for example, be of the type described in international patent application WO 2005/009874 in the name of the same applicant, where the conveyor consists of a plurality of links made of rigid plastic and suitably articulated to each other.

More specifically, each mounting frame 121, 141 forms an initial straight section for the respective first and second conveyor 12 and 14 and a straight terminal section for the conveyors 12, 14.

In FIG. 1, the numerals 123, 143 denote the parallel straight sections at the initial, or upstream, ends of the respective conveyors 12, 14, while the numerals 144, 124 denote the parallel straight sections at the terminal, or downstream, ends of the conveyors 12, 14.

The curved sections 12a, 14a are located between the initial straight sections 123, 143 and the terminal straight sections 124, 144 of the respective conveyors 12, 14.

As illustrated, the feed means 12, 14 comprise respective upward sloping sections corresponding to the terminal sections 124, 144 of the conveyors, where the frames 121, 141 cause the respective conveyors to follow a path that slopes slightly upwards in order to facilitate the subsequent outfeed step, as described in more detail below.

As illustrated, upstream of this conveying device, there are means 16 for feeding the card tubes 11 out of a respective machine where the tube is made from respective rolls of card, the machine 16 comprising a downward sloping chute 16' having an end 163 that extends between the conveyors 12, 14. The numerals 164 and 165 respectively denote sensors for detecting the minimum core load and the maximum core load transferred from the machine 16.

The machine 16 also comprises means, not illustrated in detail in the drawings, for sequentially releasing the long items 11 in such a way as to transfer them to the conveyors 12, 14 one at a time.

The feed means of the device according to the invention advantageously comprise means 126, 146 for engaging the backs of the tubular items 11.

More specifically, the back engagement means 126, 146 take the form of respective elements, each integral with and protruding from the upper surface of a link forming part of the conveyors 12, 14.

The protruding elements each take the form of a substantially flat, quadrangular protruding element 126, 146.

In particular, as illustrated, the first and second feed means 12, 14 comprise respective pluralities of elements 126, 146, equally spaced in the longitudinal feed direction, for engaging the backs of the items 12.

Advantageously, the back engagement elements 126 of the first feed means 12 are separated from each other by a certain number of links, while the back engagement elements 146 of the second feed means 14 are separated from each other by a predetermined number of links smaller than the number of links separating the back engagement elements 126 of the first feed means 12.

Figure 2:
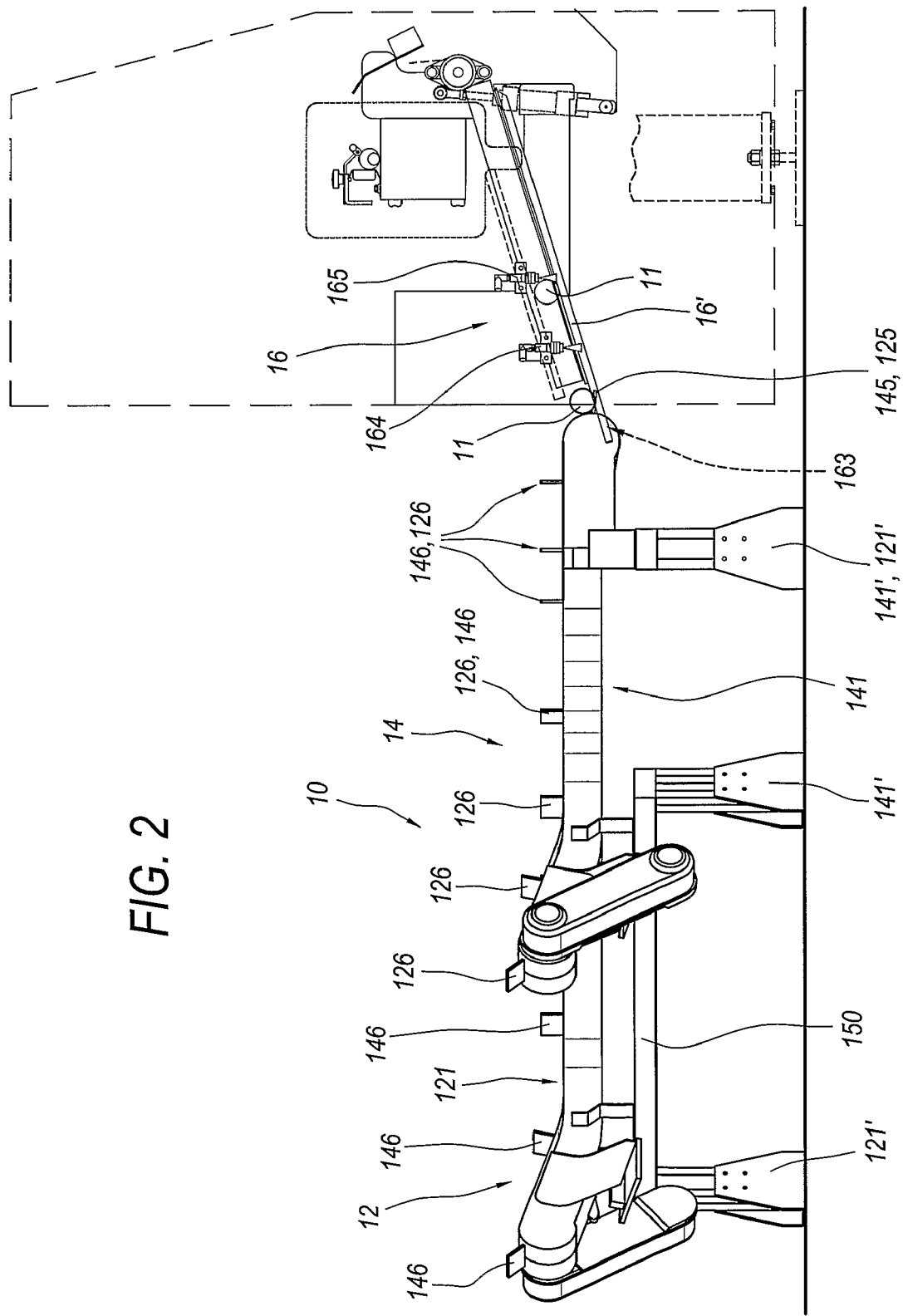
FIG. 2 is a schematic side view showing the rear portion of the preferred embodiment of the device according to the invention.
Figure 4:
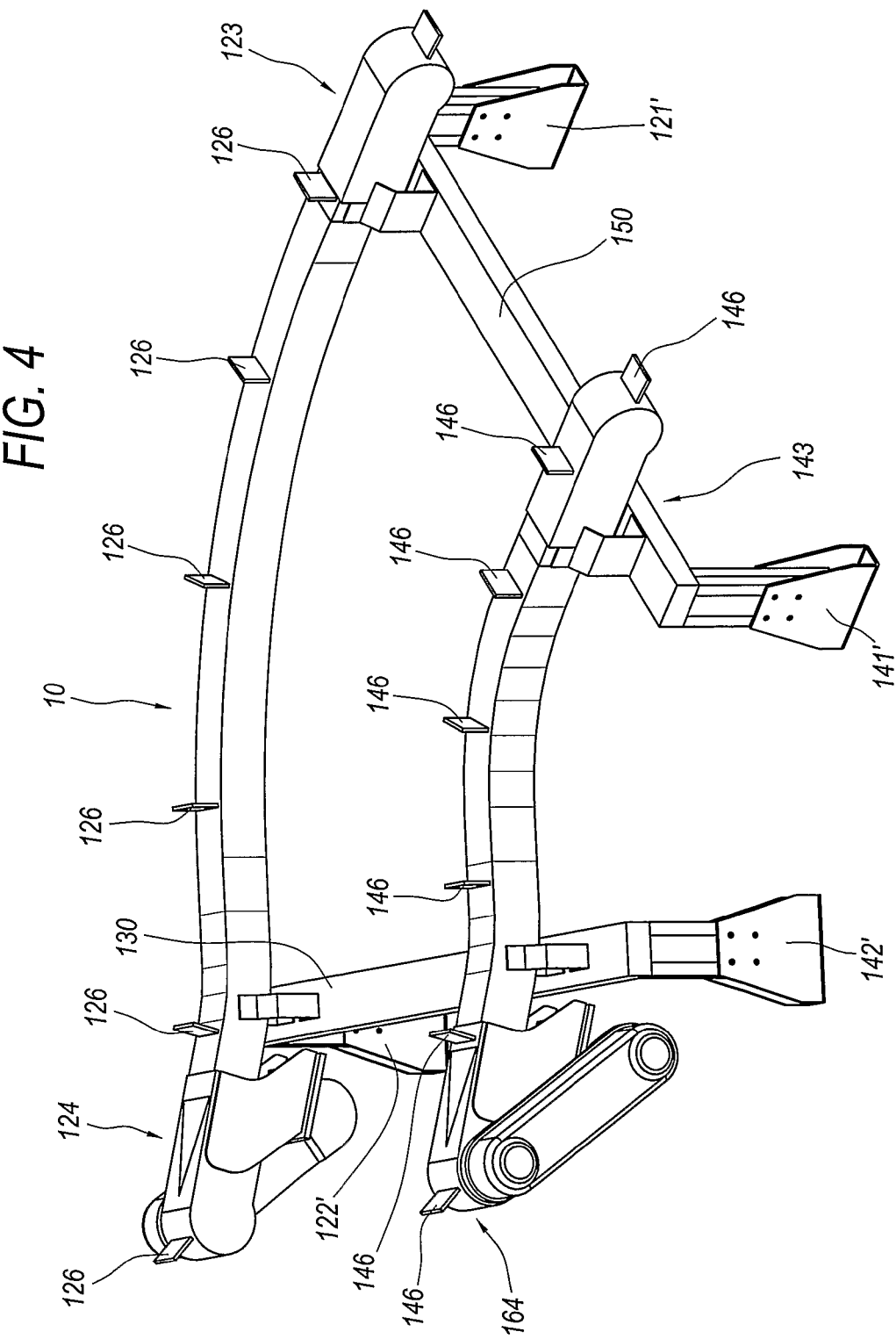
FIG. 4 is a perspective view of the preferred embodiment of the device, according to the invention detached from the preferred context in which it is used.

As shown in FIG. 2, the first and second back engagement elements 126, 146 are designed to receive the items 11 at an upward sloping, or lifting, section and, more specifically, at a respective transfer wheel at the upstream end of the first and second conveying means 12, 14.

At the downstream end, the engagement means 126, 146 push and allow the long items 11 to slide onto a chute 17 which slopes downwards and transfers the tubular items 11 to the infeed end of respective means 18 that lift and transport them towards a feed magazine of the rewinding machine or system which makes the paper rolls, in particular, rolls of kitchen or toilet paper.

As illustrated, the means for lifting the tubular card cores 11 comprise respective rear engagement elements 181 for lifting the items 11 and extending outside the respective chute 17.

The reference numeral 182 denotes means for guiding and retaining the tubular items 11 on the horizontal slats 181 of the respective means that lift and transport them to the feed magazine of the paper roll rewinding machine.

As illustrated, the mounting frame of the conveyors 12 and 14 comprises respective floor supporting columns 121', 141' and supporting crossbars, labelled 150, connecting opposite side columns 121', 141'.

As shown in FIG. 3, the point where the tubular items 11 are transferred is at substantially the same height as the horizontal surface on which they are conveyed by the feed means. The transfer end of the chute is labelled 17a in FIG. 3.

Figure 5:
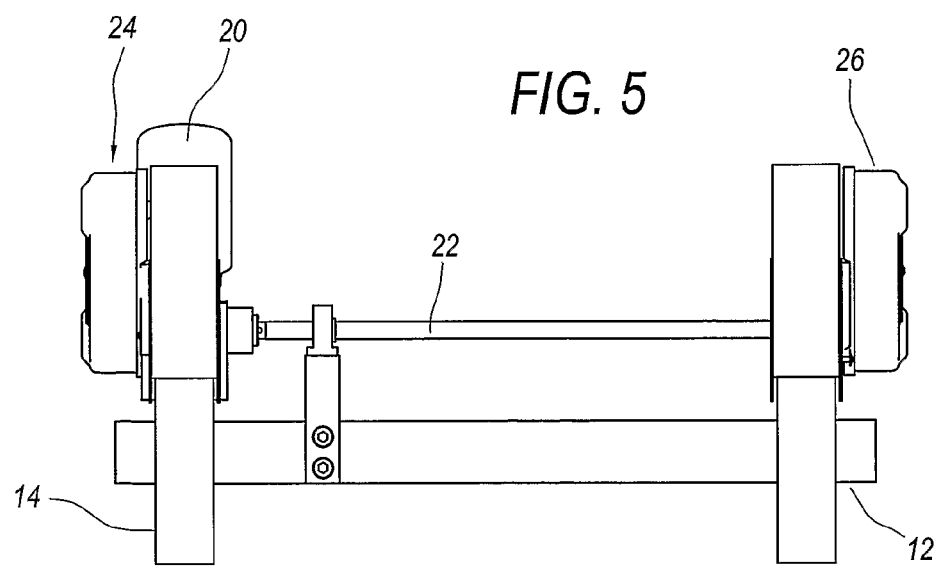
FIG. 5 is a schematic side view of the end portion of the preferred embodiment of the device according to the invention, showing the drive means in particular.

Means are also provided for driving the first and second conveyors 12, 14 and comprising a single drive motor, labelled 20 in FIGS. 5 and 6, designed to rotationally drive a transversal shaft 22 which is in turn connected through respective transmission means 24, 26 to the drive wheels of the conveyors 12, 14.

More specifically, the transmission means 24 comprise, like the transmission means 26 of the first conveyor 12, a transmission belt 240 trained around respective pulleys 242, 244. Instead of the belt and pulleys, a chain and sprocket system might also be used.

In particular, the toothed wheels or sprockets engaging the links of the conveyors 12 and 14 have a different number of teeth, their number being, in particular, a multiple of the number of links between which there is a respective engagement element 126, 146 so that the engagement elements 126, 146 at the infeed end and at the outfeed end are transversally aligned.

According to one preferred embodiment, there are ten links defining the spacing between two consecutive tubular item 11 engagement elements 126 on the outer conveyor 12, and seven links defining the spacing between two consecutive tubular item 11 engagement elements 146 on the inner conveyor 14. The drive wheel of the outer conveyor 12 therefore has twenty teeth, while the drive wheel of the inner conveyor 14 has fourteen teeth.

A drive system that is easy to assemble and set up is thus obtained.

In practice, the first and second conveyor means 12 and 14 follow parallel paths starting from the straight initial section, continuing along the intermediate curved section, where the paths followed are concentric, and ending at the straight terminal section.

The invention described is susceptible of industrial application and may be modified and adapted in several ways without thereby departing from the scope of the inventive concept. Moreover, all the details of the invention may be substituted by technically equivalent elements.

The invention claimed is:

1. A device for moving and orienting long items, these items being, more specifically, tubular cores made of card for making rolls, each long item having a longitudinal axis (L) and opposite ends, the device comprising:
means for defining an angular movement of the axis (L) of the long item, such that the long item is fed out of the device at a suitable angle, said means configured to cause the long item to be fed forward while keeping the long item substantially transversal to a direction of feed; and
first and second feed means comprising respective first and second pluralities of means for engaging a back of the long item, the first feed means including first back engagement elements separated from each other by a predetermined first number of links, and the second feed means having second back engagement elements separated from each other by a predetermined second number of links smaller than the first number of links separating the first back engagement elements of the first feed means.

2. The device according to claim 1, further comprising:
first mobile means for feeding a corresponding portion of the long item, the first mobile means extending along a first respective path with a first curved section; and
second mobile means for feeding a second portion of the long item, the second mobile means extending along a second respective path having a second curved section concentric with and radially inside the first curved section of the first mobile feed means.

3. The device according to claim 1, further comprising:
first means for feeding the items, said means being configured to engage an intermediate portion of each item.

4. The device according to claim 3, further comprising:
second means for feeding the items, said means being configured to engage a respective intermediate portion of each item.

5. The device according to claim 1, further comprising:
feed means supporting a bottom of the long item.

6. The device according to claim 1, further comprising:
feed means moving along a mainly horizontal path.

7. The device according to claim 1, further comprising:
feed means taking the form of respective endless conveyors each composed of a plurality of links articulated to each other and mounted on a respective frame and forming a respective conveyor path.

8. The device according to claim 1, further comprising:
feed means having at least one straight section.

9. The device according to claim 8, wherein the feed means have an initial straight section.

10. The device according to claim 8, wherein the feed means have a terminal straight section.

11. The device according to claim 10, wherein the curved section of the feed means extends between the initial straight section and the terminal straight section.

12. The device according to claim 1, wherein the first and second feed means have an upward sloping section.

13. The device according to claim 12, wherein the first and second feed means have a terminal upward sloping section.

14. The device according to claim 1, wherein the engagement elements of the first and second pluralities of means for engaging a back of the long item extend from respective links of respective feed conveyors.

15. The device according to claim 1, wherein the back engagement elements of the first and second feed means are configured to receive the long item at a location where the first and second feed means slope upwards.

16. The device according to claim 1, further comprising:
a chute for feeding out the long item.

17. The device according to claim 1, further comprising:
an end where the long item is transferred, the end extending at substantially a same height as a horizontal surface on which the long item is conveyed by the first and second feed means.

18. The device according to claim 1, further comprising:
means for driving the first and second conveyors.

19. The device according to claim 18, wherein the means for driving the first and second conveyors comprise a single drive motor designed to rotationally drive a transversal shaft connected through respective transmission means to drive wheels of the first and second conveyors.

20. The device according to claim 1, wherein the first conveyor means and the second conveyor means move along respective paths parallel to each other.

\* \* \* \* \*